Patented Mar. 12, 1946

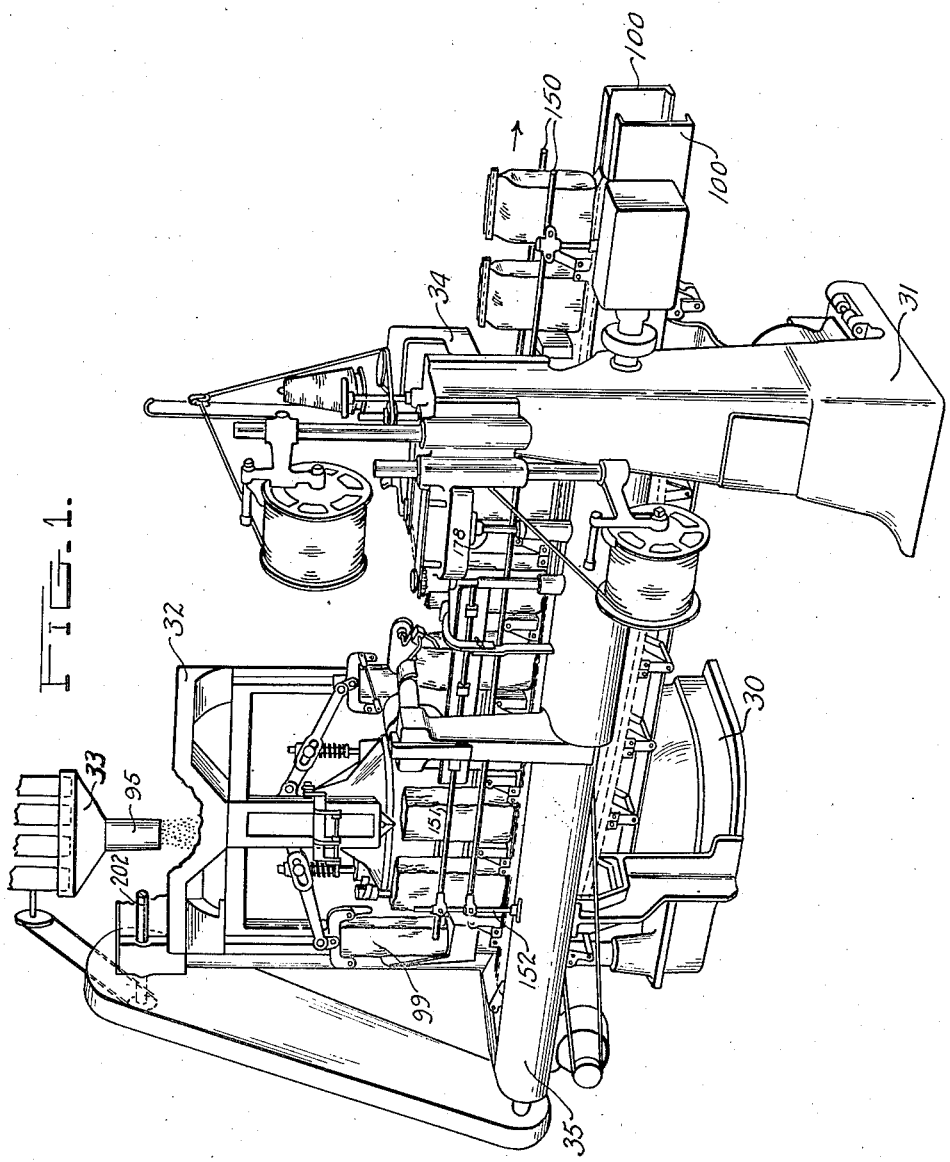

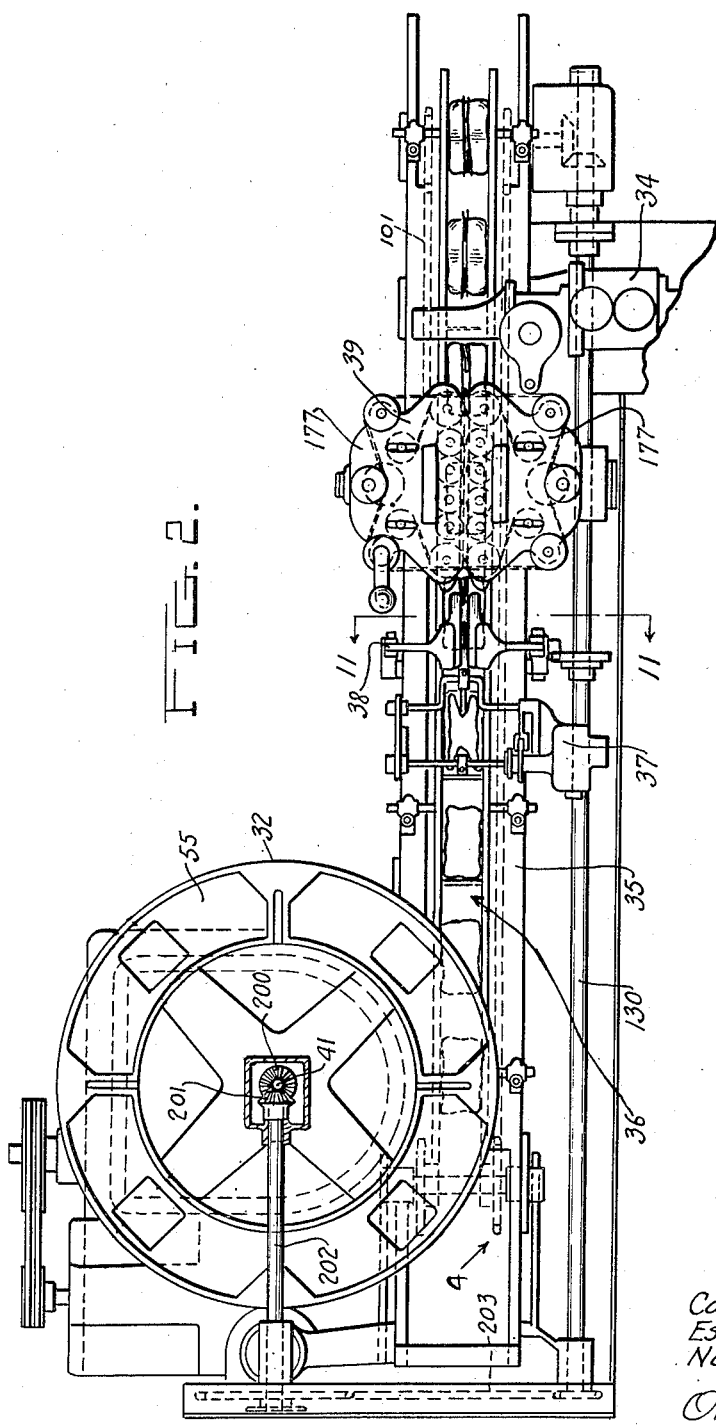

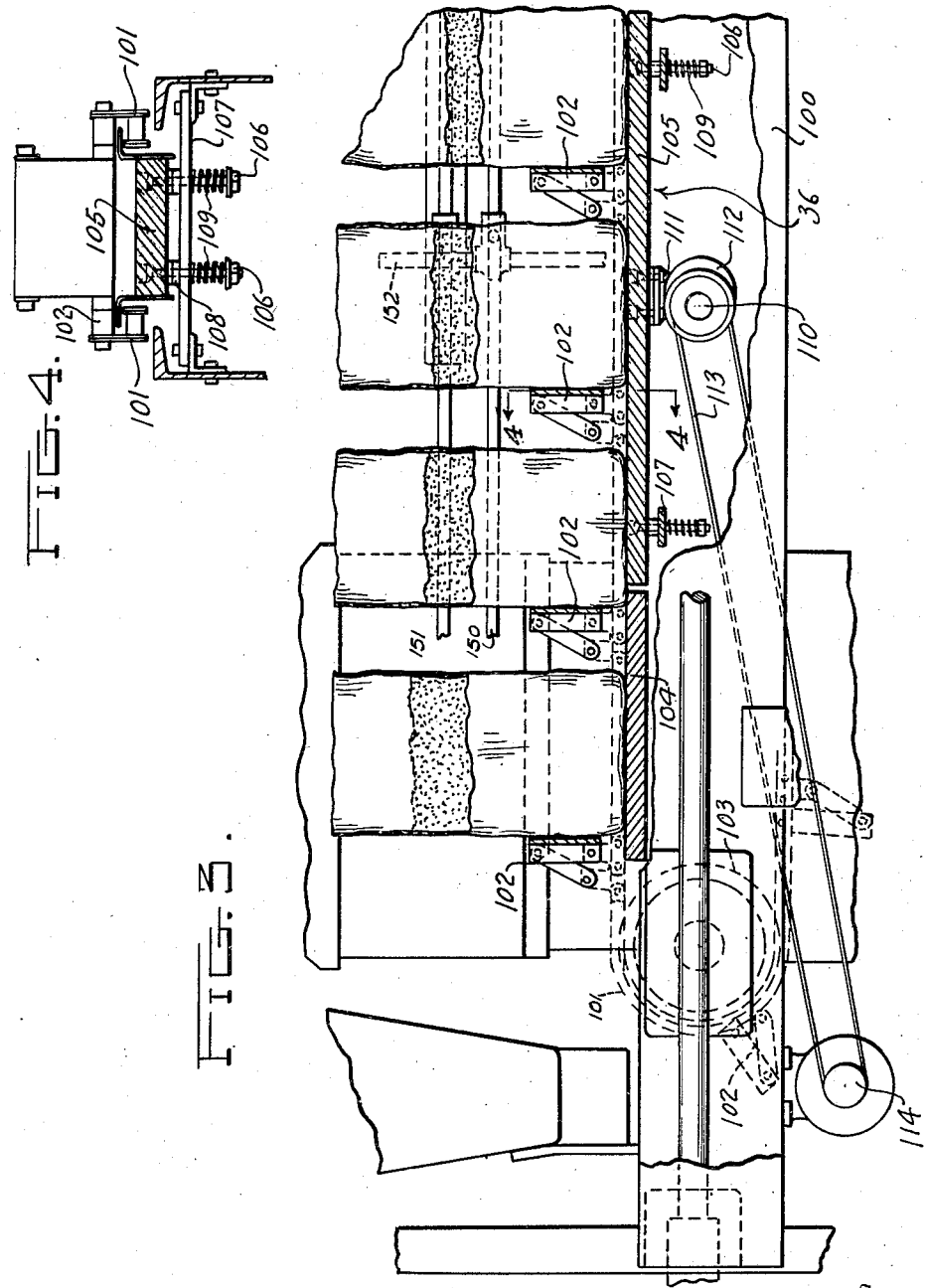

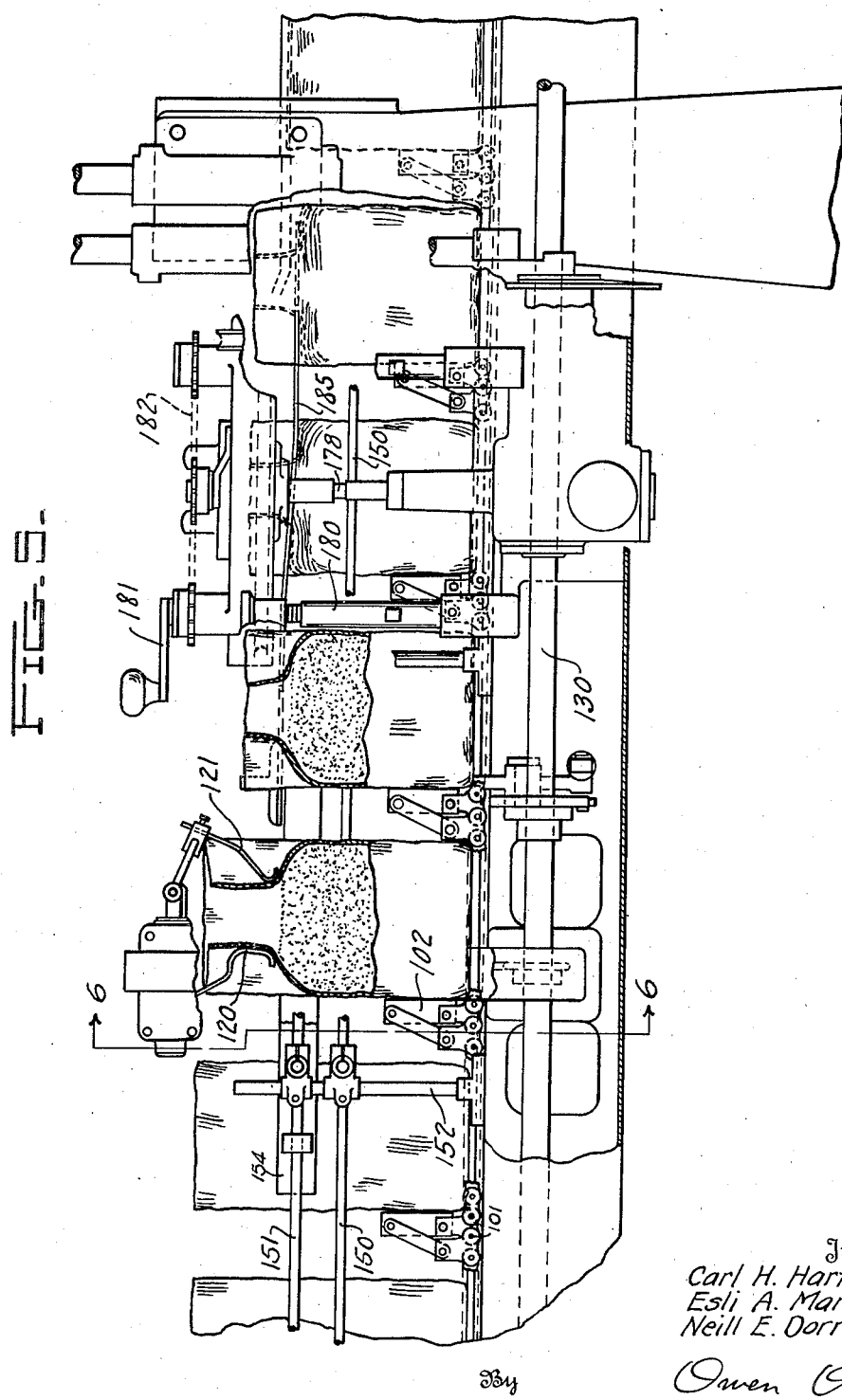

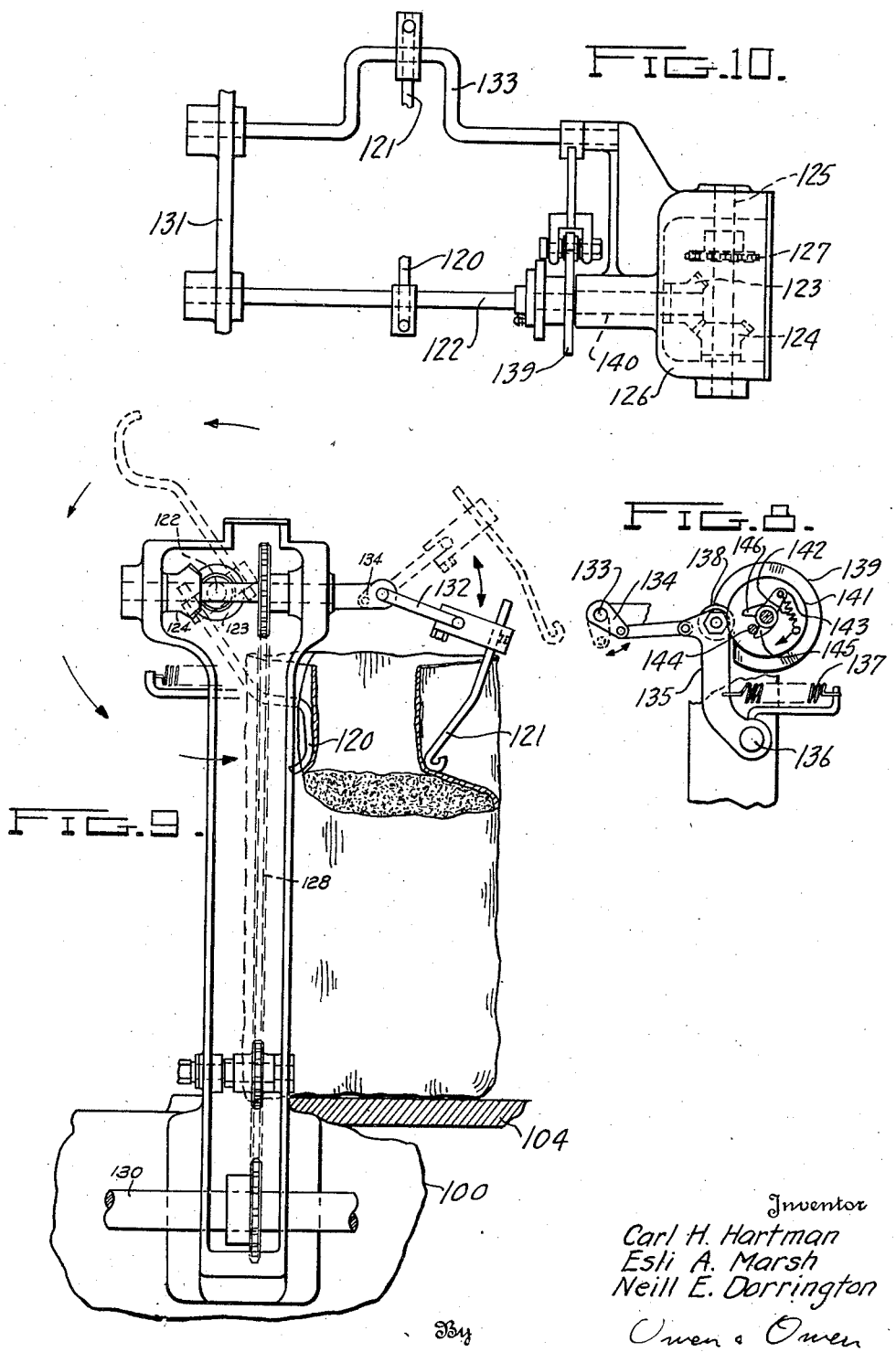

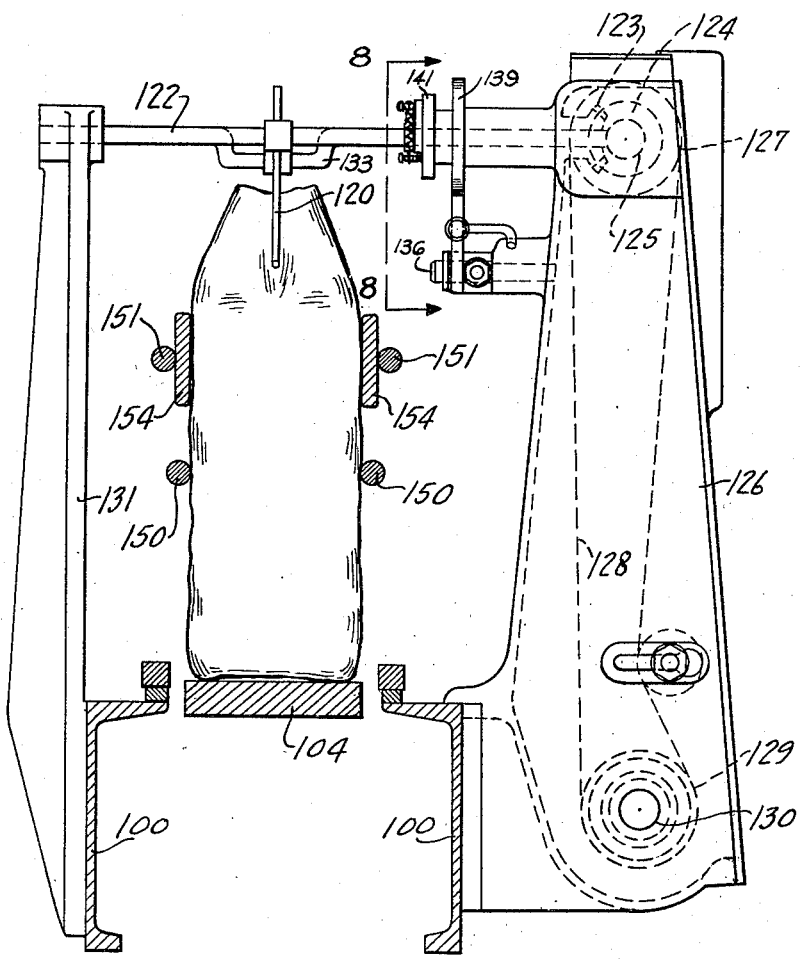
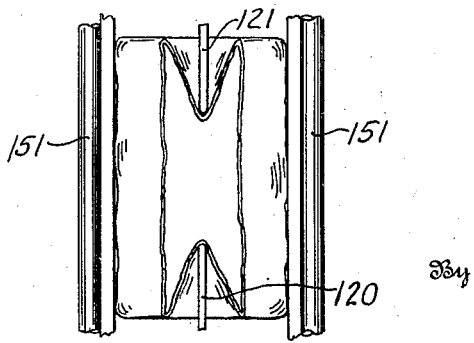

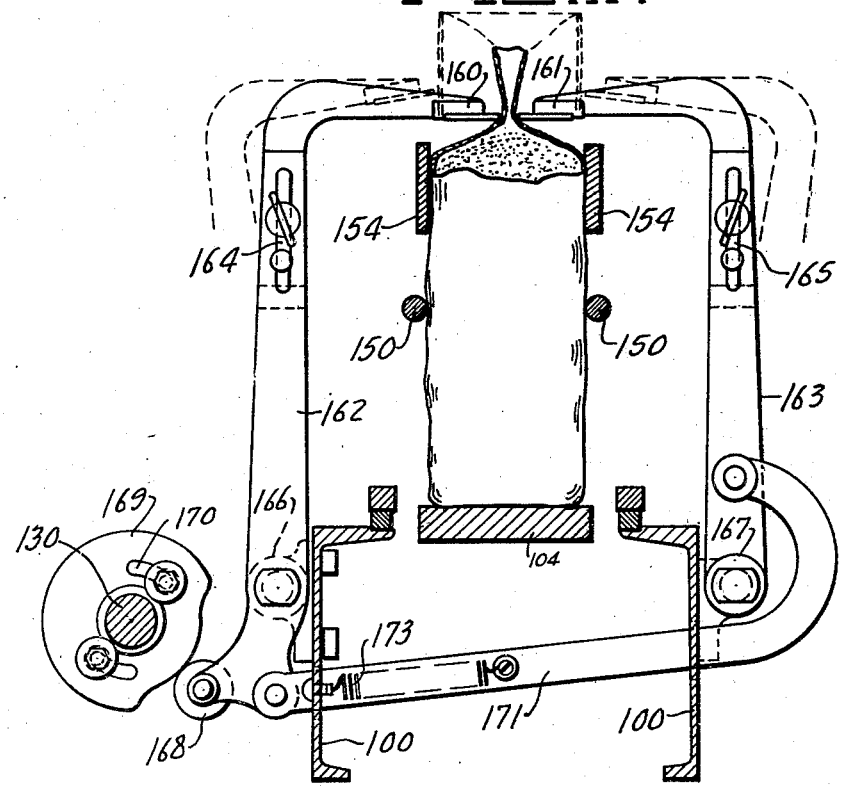
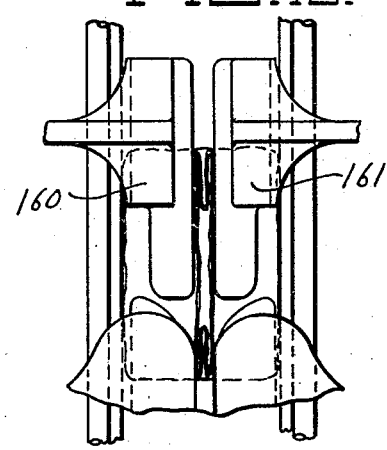

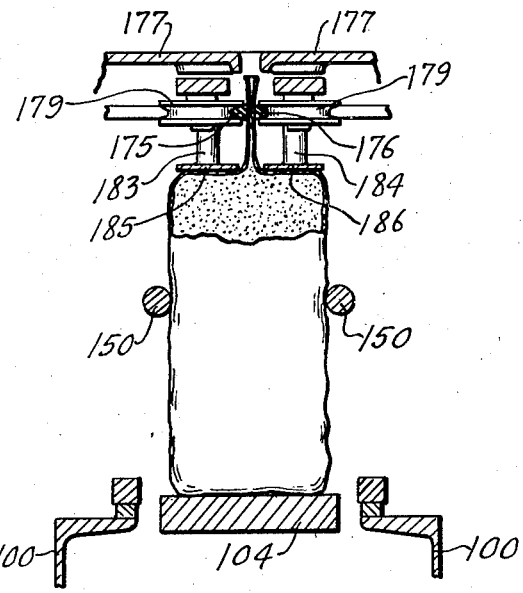
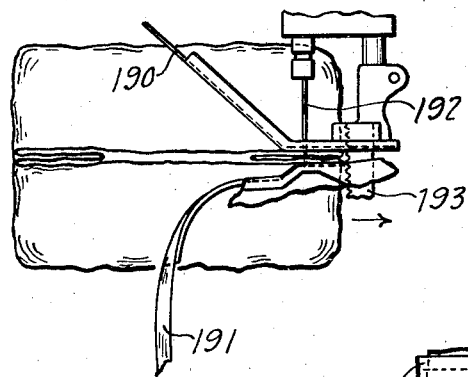
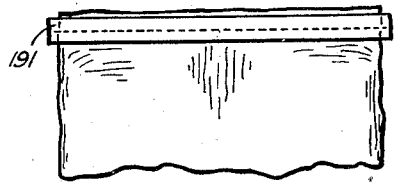

2,396,262

UNITED STATES PATENT OFFICE 2,396,262

APPARATUS FOR CLOSING BAGS

Carl H. Hartman, New Rochelle, and Esli A. Marsh and Neill E. Dorrington, Oswego, N. Y., assignors to St. Regis Paper Company, New York, N. Y., a corporation of New York Application May 2, 1939, Serial No. 271,372

5 Claims. (Cl. 112—11)

This invention relates to apparatus for conveying open mouthed filled bags and closing the tops thereof while they are being conveyed.

A more specific object of the invention is to maintain the bags with flat sides while being conveyed, square the shoulders, and close the bags closely above the squared shoulders.

Other details and objects of the invention will appear as the description proceeds.

In the accompanying drawings forming a part of this invention

Fig. 1 is a perspective view of the apparatus viewed from the corner on which the sewing machine is located;

Fig. 2 is a plan view of the apparatus shown in Fig. 1;

Fig. 3 is an enlarged view, partly in section, showing the end of the conveying means for receiving the filled bags;

Fig. 4 is a detail section on the line 4—4 of Fig. 3;

Fig. 5 is an enlarged side view, partly in section, of the apparatus for folding and closing the top of the bag;

Fig. 6 is an enlarged section approximately on line 6—6 of Fig. 5;

Fig. 7 is a plan view of the bag and tucking fingers shown in Fig. 6;

Fig. 8 is a detail section on the line 8—8 of Fig. 6;

Fig. 9 is an enlarged side elevation of the bag top tucking mechanism, a part being in section;

Fig. 10 is a plan view of the mechanism shown in Fig. 9;

Fig. 11 is an enlarged section approximately on the line 11—11 of Fig. 2;

Fig. 12 is a partial plan view of Fig. 11;

Fig. 13 is an enlarged vertical section of the bag top being shaped for sewing;

Fig. 14 is a diagrammatic plan view of the sewing and trimming steps; and

Fig. 15 is a side view of the top of the closed bag.

Referring to the apparatus as shown in Fig. 1, the general construction comprises a base 30 and a base 31. Upon the base 31, there is mounted bag opening and filling means indicated generally by reference number 32. There is indicated somewhat diagrammatically a weighing apparatus designated by 33 in position to deliver weighed charges to the successive bags. Upon base 31, there is shown to be mounted a sewing apparatus 34. Between the opening and filling apparatus and the sewing machine for closing the bag, there is conveying and bag folding means indicated generally on Fig. 1 by reference number 35. This conveying and folding means comprises jigging means indicated on Fig. 2 by reference number 36, a gusset tucking device indicated at 37, side folding apparatus indicated at 38, and top shaping and conveying apparatus designated as a whole by reference number 39.

The filled bag 99 which is discharged from the filling apparatus is forwarded to the sewing machine by mechanism which will now be described.

This portion of the apparatus is supported upon beams 100 which extend from the sewing machine end of the apparatus, as shown on Fig. 1, to the filling end of the machine. At each side there operate chains 101 which are connected at intervals by suitable pushers 102, as clearly indicated in Figs. 3, 4 and 5, for example. The chains are driven by suitable sprocket wheels 103. Suitably supported upon the beams 100 there is a bottom support or slideway 104 for the filled bags. A portion of this slideway, as shown at the right of Fig. 3 and designated 105, is mounted upon pins 106 which pass through cross pieces 107 mounted upon beams 100. Normally member 105 rests upon rubber cushions 108 interposed between the cross pieces and the bottom of member 105. Springs 109 normally hold member 105 in its lower position.

Member 105 is given vertical reciprocating or jigging motion by any suitable apparatus. In the construction shown, a shaft 110 is mounted in brackets 111 attached to the under side of member 105. This shaft has connected thereto an eccentric weight 112, the details of which are not shown, but which operates to impart vertical impulses to the member 105 by the eccentric motion of the weights when shaft 110 is rotated. Member 105 is allowed sufficient vertical movement to jig the bags resting thereon. Springs 109 and cushions 108 allow resilient vertical action of member 105, while cushioning that movement and preventing objectionable noise. Shaft 110 is indicated as being driven by belt 113 from a suitable pulley 114 which in turn is driven in any suitable manner. As the bags are successively shoved along over member 105, the vertical reciprocation of that member imparts a jigging action to each bag, and the material is settled in the bag.

As the bag is moved along the slideway, the top of the bag is folded in preparatory to sewing. Where gusseted bags are employed, it is preferable to first tuck in the gusseted sides. The apparatus for accomplishing this purpose is shown in Figs. 5 to 10, inclusive, and comprises an actuating finger 120 which is moved in a circular path to strike the top of the bag from the rear and move the rear gusseted side forward, and a finger 121 which is oscillated to alternately descend and strike rearward the forward gusseted side and to rise out of the path of the bag.

Member 120 is mounted upon a shaft 122 which is rotated continuously from a bevel gear 123 meshing with a bevel gear 124 on a short shaft 125 mounted in a bracket 126 rising at one side of the frame of the machine. Shaft 125 carries a sprocket wheel 127 which is driven by a chain 128 from a sprocket wheel 129 on a continuously rotating shaft 130 which runs longitudinally of the machine. The other end of shaft 122 is supported by a bracket 131 rising from the other beam 100.

The member 121 for tucking in the forward gusset is mounted on an arm 132 on a rockshaft 133. Another arm 134 of the rockshaft is driven by a lever 135 pivoted at 136 and normally urged by a spring 137 in the direction to lower the tucking finger 121. Lever 135 carries a roller 138 which contacts a cam 139 on a sleeve 140 which is directly driven by bevel gear 123.

Shaft 122 is connected to sleeve 140 through a yielding connection indicated on Fig. 8, the member 141 on the end of sleeve 140 turning in the direction of the arrow. A tension spring 142 connects a pin on member 141 with an arm 143 on shaft 122 and normally turns shaft 122 until stop 144 is encountered by lug 145. It will be obvious that, if finger 120 meets excessive resistance, spring 142 will yield so as to allow the finger 120 to slow up in its movement until the bag moves forward slightly, or until pin 144 encounters lug 146, whereupon the drive becomes positive.

It will also be seen that spring 137 which normally presses tucking finger 121 downward, will yield if excessive resistance is met by that finger. In this way, if the bag happens to be slightly out of position or if for any other reason there is unusual resistance to the movement of the tucking fingers, they yield sufficiently so that there is no danger of injuring the bag.

The top of the bag can be folded more accurately and satisfactorily if the sides of the bag are held parallel so that the package assumes an approximately rectangular cross-section instead of being rounded or oval. For the purpose of accomplishing this result, there are indicated bars 150 and 151 mounted upon posts 152, as shown on Figs. 5 and 6. Inside of the upper bars 151 along the stretch where the top of the bag is being tucked in and folded, there are relatively wide shaping bars 154. These upper bars are not shown as extending beneath the sewing machine, but the lower bars 150 are shown as extending to the delivery end of the apparatus.

After the gussets have been tucked in as described above, the two sides of the top of the bag are brought together by folding members 160 and 161, as clearly indicated in Figs. 11 and 12. As clearly shown in Fig. 11, the members 160 and 161 are mounted upon the ends of arms 162 and 163 by means of adjustable pin and slot connections 164 and 165. That is so that the height of these folding members can be adjusted from time to time, if the filling of bags of different lengths or other reasons renders it desirable. It will also be noted that the bars 150, 151 and 154 are adjustable vertically upon posts 152.

The arms 162 and 163 are pivoted at 166 and 167 upon the beams 100. Arm 162 is extended below its pivot 166 and carries a cam roller 168 which contacts a cam 169 on shaft 130. The cam is preferably mounted on the shaft by pin and slot connection 170 so that the timing of members 160 and 161 can be adjusted with respect to the other operations of the apparatus. The extended end of arm 163 is connected by a link 171 with arm 163 so that the arms are moved simultaneously. In the construction shown, there is a spring 173 connected to frame member 100 and link 171 and urging cam roller 168 into contact with cam 169.

As will be seen from an inspection of Fig. 11, the members 160 and 161 are moved in operative direction by spring 173 when the cam allows that movement, so that their working stroke is yielding, but are forcibly driven on the nonoperative stroke to the position shown in dotted lines.

Immediately after the top of the bag is collapsed by members 160 and 161, it moves between belts 175 and 176 which are mounted in frames 177. (See Figs. 13, 1 and 2.) The belts are driven in unison by an upright shaft 178 which in turn is driven from shaft 130 by suitable connections, not shown. Shaft 178 appears on Figs. 1 and 5. The belts may be yieldingly pressed towards each other by a series of rollers 179 so that the belts grip the top of the bags yieldingly. (See Fig. 13.) Preferably, the belts are made of or faced with rubber or the like, so that in any case they exert yielding pressure upon the bag tops.

Frames 177 are mounted for vertical adjustment upon posts 180, the vertical adjustment being effected by suitable screws, there being a crank handle 181 on one of these screws and connections by a chain 182 to the other screws so that both holders 177 may be raised and lowered simultaneously when desired. (See Fig. 5.)

Beneath belts 175 and 176 and supported by posts 183 and 184 which depend from holders 177 there are pressing and squaring bars 185 and 186 which are spaced so as to progressively press down the shoulders of the bag. These bars slant downward in the direction of movement of the bags, as clearly indicated on Fig. 5 so that the shoulders of the bag are pressed down and squared, and the collapsed top of the bag extends upward for a considerable distance in collapsed condition. The yielding grip of the belts upon the top of the bag holds the top of the bag yieldingly against the downward pressure of the squaring bars, so that the walls of the bag are drawn snugly over the material and around the inner sides of the bars, which results in a properly shaped bag with the walls smoothly drawn over the material and up to the point where the bags are to be closed.

After the bag top has been squared in this way, it passes through a sewing machine which may be of the type disclosed in the Bates Patent No. 1,625,781, issued April 26, 1927, or any other suitable bag sewing apparatus. In the construction shown, two tapes 190 and 191 are fed to the seam on each side of the bag and after the needle 192 has sewed the seam, as indicated on Fig. 14, a knife 193 trims off the top of the bag so that the closed bag is discharged with its top squared and trimmed as indicated in Fig. 15.

Shaft 130 may be driven in any desired manner, but is preferably driven in timed relation to the bag opening and filling device. In the construction shown, a bevel gear 200 on the top of shaft 41 (the central shaft of the associated bag filling device) meshes with a bevel gear 201 on horizontal shaft 202, which in turn drives a chain 203 running over a sprocket wheel on shaft 130, as indicated on Fig. 2.

The tucking fingers are desirable since they tuck in the corners of the bag top and shorten the seam which is necessary to close the top of the bag. The collapsing device 38 flattens the top of the bag in a plane in the direction of its travel towards the sewing machine and this collapsed top is resiliently clamped between the forwarding belts. The shoulder-forming rails beneath these belts press the walls of the bag downward and inward and not only square the shoulders of the bag, but produce a longer collapsed portion of the bag top above the material therein. This enables the seam to be sewn at a lower point than it could otherwise. As has been noted in connection with Fig. 14, the top of the bag is trimmed off above the seam so that the finished package does not have any unnecessary length of material. The manufacture of this compact package is also facilitated by the complete opening of the bag before the filling operation as well as the settling of the material in the bag, the flattening of the sides of the bag while the bag top is being folded and the squaring of the top of the bag as just described. For this reason, these features all cooperate in producing a desirable, properly shaped and compact filled bag. Therefore, the various parts of the apparatus are advantageously employed together, although some features might be employed by themselves with some advantage.

What we claim is:

1. Apparatus for feeding the top of a filled bag to a sewing machine comprising belts between which the top of the bag is yieldingly gripped, and a member on each side of the bag top beneath the belt and slanting downward in the direction of movement of the bag toward the sewing machine, whereby said members press the bag walls inward and downward and the bag shoulders are squared.

2. Apparatus for feeding the top of a filled bag to a sewing machine comprising belts between which the top of the bag is yieldingly gripped, and a member on each side of the bag top beneath the belt and slanting downward in the direction of movement of the bag toward the sewing machine, whereby said members press the bag walls inward and downward and the bag shoulders are squared, and the collapsed portion of the bag is extended, the sewing machine being provided with means for trimming off the top of the bag above the seam.

3. Apparatus for closing filled bags comprising a sewing machine, means to convey a series of bags in succession to the machine, means for collapsing the top of the bag above the filling therein into a plane parallel with its direction of travel as it approaches the machine, belts yieldingly gripping the collapsed top of the bag therebetween and moving therewith towards the machine, and a stationary member beneath the respective belt on each side of the collapsed top, each member having an under surface adapted to contact the wall of the bag where it is slanted inward over the filling therein towards the collapsed portion of the bag top, and said surface slanting downward towards the end of the member adjacent the sewing machine, whereby the shoulders of the bag are squared and the length of the collapsed portion is extended.

4. In apparatus for closing filled bags comprising a machine for forming a closure at the collapsed top of a filled bag, means to convey filled bags in succession to said machine, means to collapse the top of each bag in succession, as it approaches the machine, in the plane of its travel, and means to yieldingly resist downward movement of the collapsed top of the bag, a shoulder-squaring member located at each side of the path of travel of the collapsed tops and above the path of the outwardly slanted bag wall beneath the collapsed top, each of said members having an under surface slanting downward towards said machine, whereby the members square the shoulders of the bags and elongate their collapsed tops as they approach said machine.

5. In apparatus for closing the top of a filled bag, a conveyor adapted to convey a filled bag to a closing device, a rotatable shaft arranged horizontally across and above the path of travel of bags on said conveyor, a rear tucking finger on said shaft movable by the rotation of the shaft to tuck forward the rear side of a bag mouth, driving means for the shaft timed with the conveyor to effect tucking action on successive bags as they are moved by the conveyor beneath the shaft, a forward tucking finger for tucking rearward the forward side of a bag mouth, connections from said driving means positively moving the last said finger out of the path of the bag top in timed relation with the operation of the rear tucking finger and yielding means to drive said fingers in their tucking strokes.

CARL H. HARTMAN.
ESLI A. MARSH.
NEILL E. DORRINGTON.